(12) United States Patent
Anthamatten

(10) Patent No.: US 12,023,875 B2
(45) Date of Patent: Jul. 2, 2024

(54) REACTION INJECTION MOLDING OF STIMULI-RESPONSIVE THERMOSETS

(71) Applicant: THE UNIVERSITY OF ROCHESTER, Rochester, NY (US)

(72) Inventor: Mitchell Anthamatten, Rochester, NY (US)

(73) Assignee: THE UNIVERSITY OF ROCHESTER, Rochester, NY (US)

(*) Notice: Subject to any disclaimer, the term of this patent is extended or adjusted under 35 U.S.C. 154(b) by 868 days.

(21) Appl. No.: 16/630,962

(22) PCT Filed: Jul. 13, 2018

(86) PCT No.: PCT/US2018/042036
§ 371 (c)(1),
(2) Date: Jan. 14, 2020

(87) PCT Pub. No.: WO2019/014560
PCT Pub. Date: Jan. 17, 2019

(65) Prior Publication Data
US 2020/0223156 A1    Jul. 16, 2020

Related U.S. Application Data

(60) Provisional application No. 62/532,738, filed on Jul. 14, 2017.

(51) Int. Cl.
| | | |
|---|---|---|
| *B29C 67/24* | (2006.01) | |
| *C08G 18/24* | (2006.01) | |
| *C08G 18/42* | (2006.01) | |
| *C08G 18/79* | (2006.01) | |
| *B29K 75/00* | (2006.01) | |

(52) U.S. Cl.
CPC .......... *B29C 67/246* (2013.01); *C08G 18/246* (2013.01); *C08G 18/4277* (2013.01); *C08G 18/792* (2013.01); *B29K 2075/00* (2013.01); *C08G 2120/00* (2013.01); *C08G 2280/00* (2013.01)

(58) Field of Classification Search
CPC .................................................. B29C 67/246
See application file for complete search history.

(56) References Cited

U.S. PATENT DOCUMENTS

| | | | |
|---|---|---|---|
| 4,748,192 A | 5/1988 | Smith | |
| 6,388,043 B1* | 5/2002 | Langer | B29C 61/003 |
| | | | 528/80 |
| 8,883,871 B2* | 11/2014 | Wilson | C08G 18/758 |
| | | | 521/170 |
| 9,080,053 B2* | 7/2015 | Masuda | C08J 7/046 |
| 2012/0168977 A1 | 7/2012 | Mayzar et al. | |
| 2016/0046845 A1* | 2/2016 | Das | C08G 18/12 |
| | | | 361/679.01 |
| 2016/0208063 A1 | 7/2016 | Garbe et al. | |
| 2019/0367771 A1* | 12/2019 | Li | C08G 18/73 |

OTHER PUBLICATIONS

L. Gasman, Markets for Shape Memory Polymers: 2016-2025, n-tech Research, 2016.
Hearon, Keith, et al. "Electron beam crosslinked polyurethane shape memory polymers with tunable mechanical properties." Macromolecular chemistry and physics 214.11 (2013): 1258-1272.
Nunes, Maria I., et al. "Micromixing assessment of confined impinging jet mixers used in RIM." Chemical engineering science 74 (2012): 276-286.
Gomes, Nuno MO, et al. "Real time control of mixing in Reaction Injection Moulding." Chemical Engineering Research and Design 105 (2016): 31-43.
Shafagh, et al., NANORIM: Sub-Micron Structuring with Reaction Injection Molding, in The 30th IEEE International Conference on Micro Electro Mechanical Systems. 2017, IEEE: Las Vegas, NV, USA. p. 213-216.
Fridman, et al., "Morphological characterization of reaction injection moulded (RIM) polyester-based polyurethanes", Polymer, 4, 393 (1980).
Li, Zaifeng, Guanghua Yang, and Chunming Xu. "Effect of the crosslink density on the morphology and properties of reaction-injection-molding poly (urethane urea) elastomers." Journal of Polymer Science Part A: Polymer Chemistry 42.5 (2004): 1126-1131.
Koo, Myung Sool, Kwansoo Chung, and Jae Ryoun Youn. "Reaction injection molding of polyurethane foam for improved thermal insulation." Polymer Engineering & Science 41.7 (2001): 1177-1186.
Hutmacher, D. W., and M. A. Woodruff. "The return of a forgotten polymerpolycaprolactone in the 21st century." Prog Polym Sci 35.10 (2010): 1217-1256.
Anthamatten, Mitchell, Supacharee Roddecha, and Jiahui Li. "Energy storage capacity of shape-memory polymers." Macromolecules 46.10 (2013): 4230-4234.
Lewis, Christopher L., Yuan Meng, and Mitchell Anthamatten. "Well-defined shape-memory networks with high elastic energy capacity." Macromolecules 48.14 (2015): 4918-4926.
Meng, J.S. Jiang, and M. Anthamatten, "Body Temperature Triggered Shape-Memory Polymers With High Elastic Energy Storage Capacity", J Polym Sci Pol Phys, 2016, 14, 1397-1404.
Meng, J.S. Jiang, and M. Anthamatten, "Shape Actuation via Internal Stress-Induced Crystallization of Dual-Cure Networks", Acs Macro Lett, 1, 115 (2015).
Meng, et al., "Photoinscription of Chain Anisotropy into Polymer Networks", Macromolecules, 23, 9100 (2016).
Erkoç, Ertugrul, et al. "Mixing dynamics control in RIM machines." Chemical Engineering Science 62.18-20 (2007): 5276-5281.
Lu, Qi-Wei, Thomas R. Hoye, and Christopher W. Macosko. "Reactivity of common functional groups with urethanes: models for reactive compatibilization of thermoplastic polyurethane blends." Journal of Polymer Science Part A: Polymer Chemistry 40.14 (2002): 2310-2328.

(Continued)

*Primary Examiner* — Michael L Leonard
(74) *Attorney, Agent, or Firm* — Meunier Carlin & Curfman LLC

(57) ABSTRACT

Disclosed are methods of using reaction injection molding to mold stimuli-responsive thermosets such as urethane linked poly(caprolactone) networks from polyols and polyisocyanates, as well as polymers prepared by such methods.

14 Claims, 7 Drawing Sheets

(56) References Cited

OTHER PUBLICATIONS

Lapprand, Aude, et al. "Reactivity of isocyanates with urethanes: Conditions for allophanate formation." Polymer degradation and stability 90.2 (2005): 363-373.
International Preliminary Report on Patentability issued for Application No. PCT/US2018/042036, dated Jan. 23, 2020.
International Search Report and Written Opinion issued in corresponding PCT Application No. PCT/US2018/042036, dated Sep. 28, 2018, 14 pages.
Meng, Yuan, et al., "Laboratory-Scale Reaction Injection Molding of Poly(Caprolactone) Elastomers for Rapid Prototyping of Stimuli-Responsive Thermosets, " Rubber Chemistry and Technology, vol. 90, No. 2, Jun. 20, 2017.
IUPAC ED—MacNaught, Alan, et al., "alkyl groups," Compendium of Chemical Terminology. IUPAC Recommendations, IUPAC Chemical Data Series. Blackwell Science, Oxford [U.A], Jan. 1, 1997. URL: http://www.iupac.org/goldbook/A00228.pdf.

\* cited by examiner

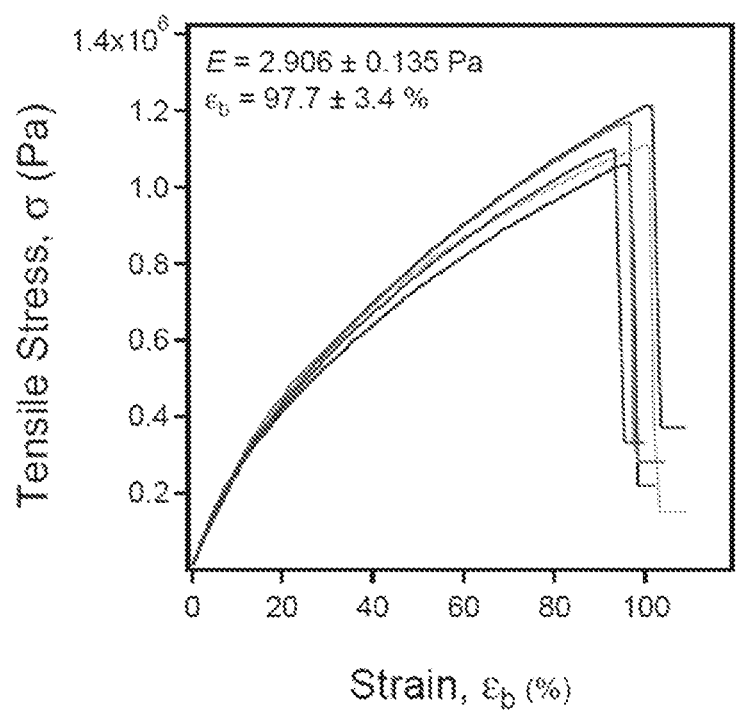
FIG. 5
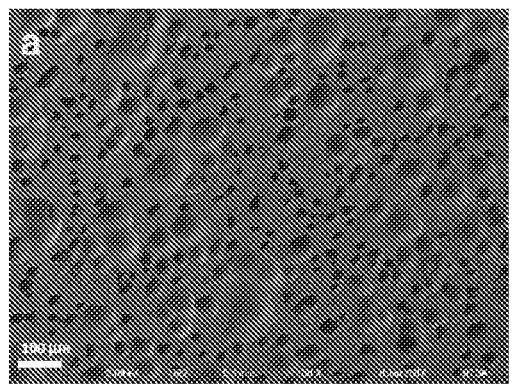 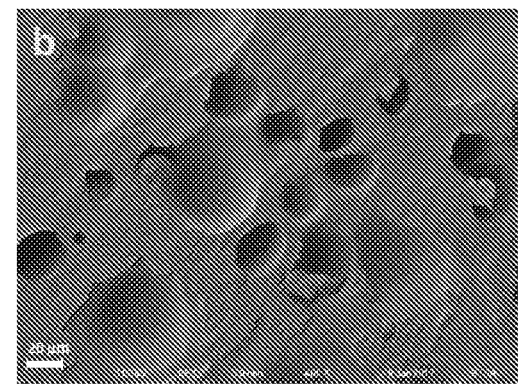
FIG. 6A  FIG. 6B

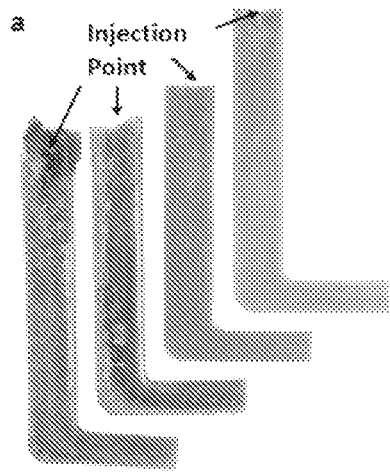 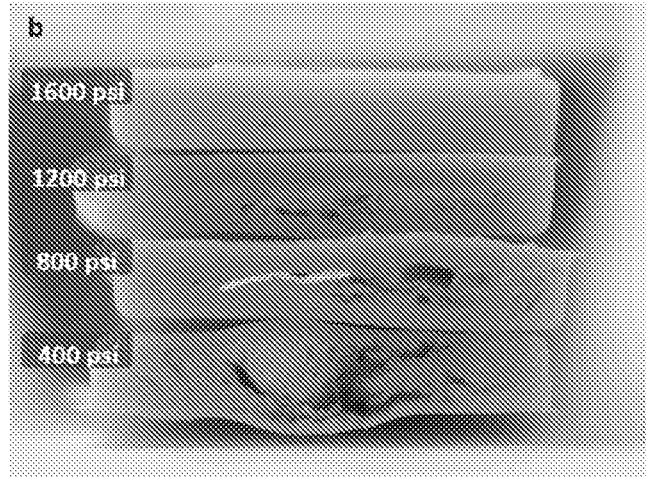
FIG. 7A    FIG. 7B
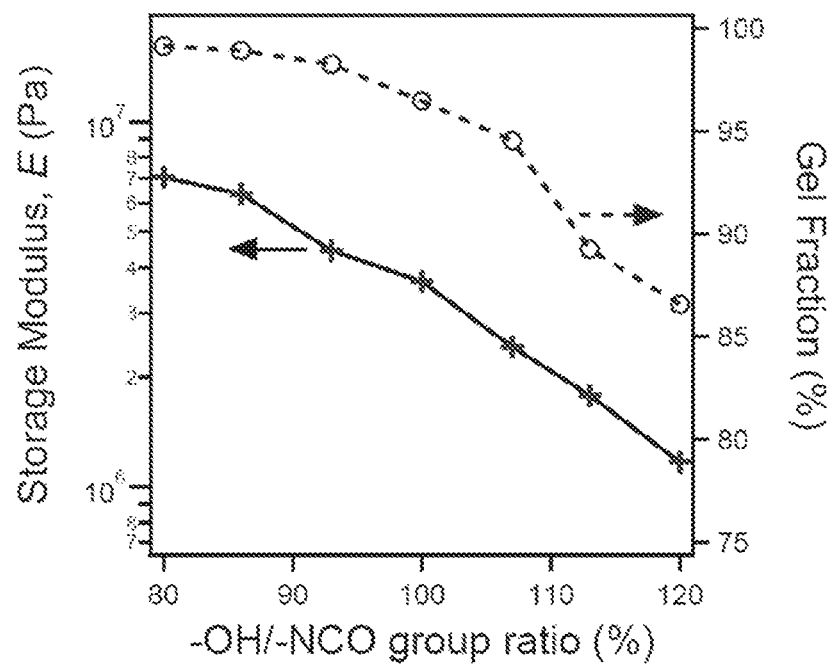
FIG. 8

REACTION INJECTION MOLDING OF STIMULI-RESPONSIVE THERMOSETS

CROSS-REFERENCE TO RELATED APPLICATIONS

This application is a national phase application filed under 35 U.S.C. § 371 of PCT/US2018/042036, filed Jul. 13, 2018, which claims the benefit of priority to U.S. Provisional Application No. 62/532,738 filed Jul. 14, 2017, the disclosures of which are expressly incorporated by reference herein in their entireties.

ACKNOWLEDGEMENT OF GOVERNMENT SUPPORT

This invention was made with government support under Grant No. ECCS-1530540 awarded by the National Science Foundation. The government has certain rights in the invention.

BACKGROUND

Actively moving polymers that change their macroscopic shape in response to a stimulus are poised for substantial growth in the aerospace, automotive, healthcare and construction sectors. In fact, the market for shape-memory polymers is projected to exceed one billion USD by 2021 and 3.4 billion USD by 2025 (L. Gasman, Markets for Shape Memory Polymers: 2016-2025, *n-tech Research*, 2016). Within this category, shape-memory thermosets—e.g., epoxy and acrylic resins, semi-crystalline networks—are sometimes preferred over shape-memory thermoplastics due to their nearly complete shape recovery, leading to robust shape-memory cycling, highly tunable properties, and two-way shape actuation (K. Hearon, et al., *Macromol Chem Phys*, 11, 1258 (2013)). However, such shape-memory thermosets are notoriously difficult to process because they comprise an insoluble chemical network with high molecular weight. The poor ability to form shape-memory thermosets into designed shapes greatly limits their application. Thus, what are needed are new methods and compositions for forming shape-memory thermosets. The methods and compositions disclosed herein address these and other needs.

SUMMARY

In accordance with the purposes of the disclosed methods, as embodied and broadly described herein, the disclosed subject matter relates to compositions and methods of making and using the compositions. More specifically, disclosed herein are shape-memory polymers or stimuli-responsive thermosets and methods of making same. In certain aspects, disclosed herein are methods of making a stimuli-responsive thermoset that comprise combining at a pressure of from about 800 psi to about 2000 psi a multifunctional isocyanate with a linear or branched composite polyol comprising a branched or linear semi-crystalline polymer segment having a low polydispersity and one or more non-crystalline segments, to thereby form a reaction mixture, and injecting the reaction mixture into a mold where the multifunctional isocyanate crosslinks the linear or branched composite polyol, thereby forming a stimuli-responsive thermoset. In further aspects, disclosed herein are stimuli-responsive thermoset that comprise a linear or branched composite polyol crosslinked with a multifunctional isocyanate, wherein the composite polyol comprises a branched or linear semi-crystalline polymer segment having a low polydispersity and one or more non-crystalline segments.

Additional advantages will be set forth in part in the description that follows or may be learned by practice of the aspects described below. The advantages described below will be realized and attained by elements and combinations particularly pointed out in the appended claims. It is to be understood that both the foregoing general description and the following detailed description are exemplary and explanatory only and are not restrictive.

BRIEF DESCRIPTION OF FIGURES

The accompanying figures, which are incorporated in and constitute a part of this specification, illustrate several aspects described below.

(FIG. 1A) isocyanate, DESMODUR™ N3300A; (FIG. 1B) poly(caprolactone) diol, CAPA™ 2054; (FIG. 1C) reaction between an isocyanate and a hydroxyl groups to form a urethane linkage; (FIG. 1D) the reversible reaction between a urethane and an isocyanate groups to form an allophanate.

(FIG. 2A) recirculation loops from supply tanks through pumps, volumetric flowmeters, needle valves and the mix-head; (FIG. 2B) material flow at the mix-head, during recirculation and injection determined by the position of the piston.

FIG. 5 shows strain-to-break curves of five individually molded specimens, with balanced stoichiometry.

FIGS. 6A and 6B show SEM cross sectional images of a cold-fractured RIM specimen.

FIGS. 7A and 7B are digital images of cured RIM specimens, processed at different injection pressures. FIG. 7A is a top-down view of cured flow patterns starting from the injection point. Left to right: injected at 400, 800, 1200, 1600 psi, respectively. FIG. 7B is a cross-sectional view of specimens near the injection point, stacked with increasing injection pressure.

FIG. 8 shows the Young's modulus at low strain (left) and gel fraction (right) plots of seven well-controlled RIM specimens with systematically different formulations.

DETAILED DESCRIPTION

Figures 1A, 1B, 1C, 1D:
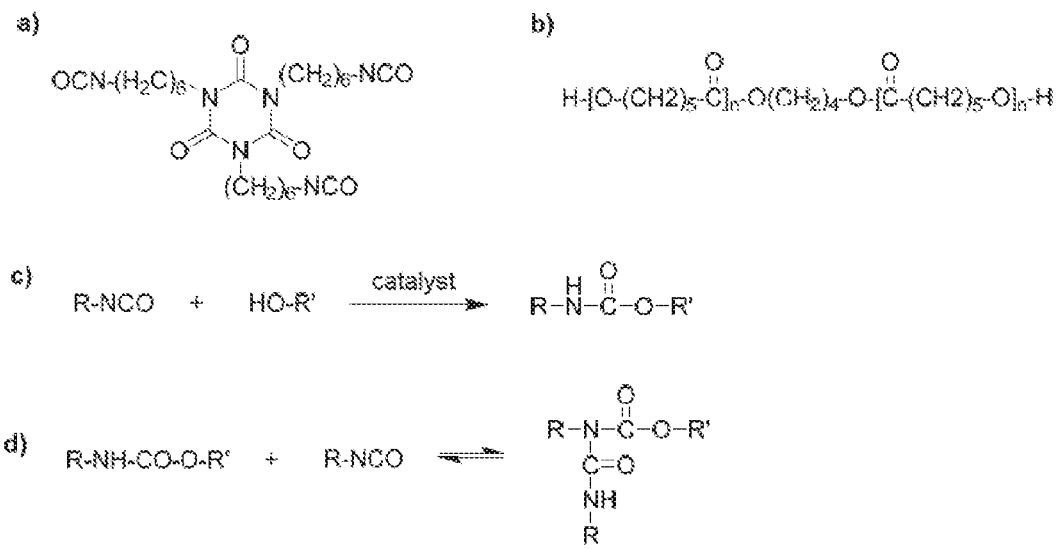
FIGS. 1A-1D contain chemical schemes showing commercially available reagents and chemistry to form cross-linked polyurethane networks.

The methods and compositions described herein may be understood more readily by reference to the following detailed description of specific aspects of the disclosed subject matter and the Examples and Figures included therein.

Before the present methods and compositions are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

In this specification and in the claims that follow, reference will be made to a number of terms, which shall be defined to have the following meanings:

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "the compound" includes mixtures of two or more such compounds, reference to "an agent" includes mixture of two or more such agents, and the like.

"Optional" or "optionally" means that the subsequently described event or circumstance can or cannot occur, and that the description includes instances where the event or circumstance occurs and instances where it does not.

It is understood that throughout this specification the identifiers "first" and "second" are used solely to aid the reader in distinguishing the various components, features, or steps of the disclosed subject matter. The identifiers "first" and "second" are not intended to imply any particular order, amount, preference, or importance to the components or steps modified by these terms.

By "substantially the same" is meant the values are within 5% of one another, e.g., within 3%, 2% or 1% of one another.

As used herein, "molecular weight" refers to number-average molecular weight as measured by 1H NMR spectroscopy by end-group analysis, unless clearly indicated otherwise.

Reaction Injection Molding

Reaction injection molding (RIM) is a process involving pressurized mixing of two or more reactive, low-viscosity liquids followed by injection into a mold and polymerization to set a part's shape in minutes or even seconds. RIM can achieve effective mixing of reagents by increasing the velocity of impinging streams; the mixing timescale should be faster than the timescales of mass flow and stress relaxation that occur upon injection of precursors into the mold (M. I. Nunes, et al., *Chem Eng Sci*, 276 (2012); M. O. Gomes, et al., *Chem Eng Res Des*, 31 (2016)). The relatively low pressure and temperature requirements for RIM translate to lower cost tooling, and RIM can successfully mold complex parts with high resolution features containing thick and thin walls (R. V. d. W. Shafagh. W and T. Haraldsson, *NANORIM: Sub-Micron Structuring With Reaction Injection Molding, in The 30th IEEE International Conference on Micro Electro Mechanical Systems.* 2017, IEEE: Las Vegas, NV, USA, p. 213-216).

RIM has been most frequently employed to prepare thermoset polyurethane (PU) networks by reacting liquid polyol and polyisocyanates to form urethane linkages as shown in FIGS. 1A-1D (I. D. Fridman, et al., *Polymer*, 4, 393 (1980); Z. F. Li. G. H. Yang, and C. M. Xu, *J Polym Sci Pol Chem*, 5, 1126 (2004)). The reaction is accelerated with a tertiary amines or metal-based catalysts; however, side-reactions may occur. Isocyanates are unstable toward a variety of nucleophiles including alcohols, amines, and even water; consequently, many different reaction byproducts can be generated, impacting the final performance of the cured material. For example, isocyanate group can react with moisture in air to produce an amine and $CO_2$, the formed amine can further react with another isocyanate, to generate a urea linking group; and ureas can further form a biuret linkage in the presence of one more isocyanates under elevated temperature. Excess isocyanate can form allophanates as well that further crosslink the network. After the urethane reaction is complete, the material hardens within a heated mold and develops strength, density, and hardness. Foaming agents are easily integrated into the RIM process, resulting in urethane networks with a targeted density and a skin layer at the mold boundary (M. S. Koo, K. Chung, and J. R. Youn, *Polym Eng Sci*. 7, 1177 (2001)).

Disclosed herein are methods for making stimuli-responsive thermosets using RIM. In a specific example, RIM was performed with poly(caprolactone) (PCL) elastomers using commercially available reagents. PCL is an attractive biomaterial owing to its superior rheological and viscoelastic properties combined with good biocompatibility and biodegradability (M. A. Woodruff and D. W. Hutmacher, *Prog Polym Sci*, 10, 1217 (2010)). PCL shape-memory thermosets with enhanced energy storage have been explored (M. Anthamatten, S. Roddecha, and J. H. Li, *Macromolecules*, 10, 4230 (2013); C. L. Lewis, Y. Meng, and M. Anthamatten, *Macromolecules*, 14, 4918 (2015)), including those with tunable trigger temperatures near the human body temperature (Y. Meng, J. S. Jiang, and M. Anthamatten, *J Polym Sci Pol Phys*, 14, 1397 (2016)), and a self-stretching ability (Y. Meng, J. S. Jiang, and M. Anthamatten. *Acs Macro Lett*, 1, 115 (2015); Y. Meng, et al., *Macromolecules*, 23, 9100 (2016)). Disclosed herein is a method that uses a RIM apparatus to prepare urethane-based PCL networks followed by injection into a preheated mold. The specimen-to-specimen variability of mechanical properties is assessed, and formulations are systematically prepared off-stoichiometry to examine trends in mechanical properties. Also disclosed are methods where a dye was introduced into one of the streams to assess component mixing at different reagent recirculation pressures.

RIM processing is scalable, and the ability to perform RIM on well-defined PCL networks can facilitate commercialization of new stimuli-responsive materials. Component mixing can be efficient within a RIM process such that the reaction to form a percolated network occur within seconds, and samples can be removed from the mold and post-cured in a traditional oven. The stiffness (Young's modulus) of typical networks is about 5 MPa, and the gel fraction is about 90% following RIM and post-curing. The molded materials contain about 10% volume of empty pores as shown in FIGS. 6A and 6B. Pores should influence mechanical properties and the control of pore morphology is an additional challenge underlying RIM. Specimens molded from stoichiometrically balanced reagents show good reproducibility with low run-to-run variability. The recirculation pressure can also be tuned to achieve high quality, homogeneous elastomers. For a lab-scale system, recirculation pressures of about 1600 psi and 1 mm orifices are sufficient to achieve homogeneous samples. For industrial scale systems, the pressure can be even higher, e.g., 2000 psi, 2500 psi, 3000 psi, or more, and the orifices can be larger to deliver material to larger molds. Samples molded off-stoichiometry with an excess of isocyanate reactive group show increased modulus, likely due to the formation of allophanates that serve as additional crosslinks. Dynamic mechanical analysis data indicate a loss of crosslinks, presumably allophanates, upon annealing above 150° C. There is evidence that crosslinks form at high temperatures in samples with an excess of hydroxyl groups, possibly due carbodiimide formation. Our results emphasize how formulation stoichiometry is a consideration when designing polyurethanes with chemical and mechanical properties that extend to high temperatures.

In specific methods, disclosed herein are methods of making a stimuli-responsive thermoset that comprise combining at a pressure of from about 800 psi to about 2000 psi a multifunctional isocyanate with a linear or branched composite polyol comprising a branched or linear semi-crystalline polymer segment having a low polydispersity and one or more non-crystalline segments, to thereby form a reaction mixture, and injecting the reaction mixture into a mold where the multifunctional isocyanate crosslinks the linear or branched composite polyol, thereby forming a stimuli-responsive thermoset.

In certain examples, the multifunctional isocyanate and linear or branched composite polyol can recirculated before being combined. That is, before they are combined, the multifunctional isocyanate and composite polyol can be circulated from their respective holding containers to the injection molding apparatus and back to their holding containers. In these methods, the multifunctional isocyanate and composite polyol should be liquid when they are recirculated, combined, and injected into the mold.

When injected into the mold, the reaction mixture cures to form the shape-memory polymer. That is, the multifunctional isocyanate and composite polyol react to form urethane crosslinks in the mold. The mold can optionally be heated or cooled to facilitate or slow this reaction. In some examples, the mold can be heated to about 30° C., or more, e.g., from about 30° C., to about 250° C., from about 30 to about 150° C., or from about 30° C., to about 50° C.

Pressure is used to combine the multifunctional isocyanate and the composite polyol. That is, the two reagents are forced into a mixing chamber of the injection molding apparatus. The pressure also ensures that the reagents are mixed. Suitable pressures for combining these reagents are from about 800 to about 2000 psi, e.g., from about 1000 psi to about 1600 psi, or from about 1450 psi to about 1600 psi. Still further, the pressure for combining these reagents can be about 800, about 850, about 900, about 950, about 1000, about 1050, about 1100, about 1150, about 1200, about 1250, about 1300, about 1350, about 1400, about 1450, about 1500, about 1550, about 1600, about 1650, about 1700, about 1750, about 1800, about 1850, about 1900, about 1950, or about 2000 psi, wherein any of the stated values can form an upper or lower end point of a range.

It is also contemplated that a portion of the linear or branched composite polyol can be first combined with the multifunctional isocyanate followed by addition of the remainder of the linear or branched composite polyol.

The amounts of multifunctional isocyanate and linear or branched composite polyol can be chosen such that hydroxyl groups and isocyanate groups are at a molar ratio of 0.8:1 to 1:0.8. For example, the molar ratio of hydroxyl groups to isocyanate groups in the reaction mixture can be 0.8:1; 0.85:1; 0.9:1; 0.95:1; 1:1; 1:0.95; 1:0.9; 1:0.85; or 1:0.8. In specific examples, the amounts of multifunctional isocyanate and linear or branched composite polyol are such that hydroxyl groups and isocyanate groups are at a molar ratio of 1:1.

In the disclosed methods, the multifunctional isocyanate can be any of the ones disclosed herein. Likewise, the composite polyol can be any of the composite polyols disclosed herein. In specific examples, the branched or linear semi-crystalline polymer segment can be a linear polycaprolactone. In other examples, the non-crystalline segment can be a $C_2$-$C_{10}$ alkyl, e.g., butyl. In further examples, the multifunctional polyisocyanate can have from 2 to 6 isocyanate groups, e.g., 3 isocyanate groups. In specific examples, the multifunctional polyisocyanate can be 1,3,5-tris(6-isocyanatohexyl)-1,3,5-triazinane-2,4,6-trione. In a specific example, the multifunctional polyisocyanate can be 1,3,5-tris(6-isocyanatohexyl)-1,3,5-triazinane-2,4,6-trione and the composite polyol can have linear polycaprolactone semi-crystalline segments and butyl non-crystalline segments and terminal hydroxyl groups.

Catalysts can also be used in the disclosed methods. The catalyst can be added individually to the reaction mixture, or preadded to either or both of the multifunctional isocyanate or composite polyol. In specific examples, the catalyst is a tin catalyst.

SMPs

Also disclosed herein are shape-memory polymers or stimuli-sensitive thermosets. These polymers can comprise a branched or linear composite polyol crosslinked with a multifunctional isocyanate, wherein the composite polyol can comprise branched or linear semi-crystalline polymer segments having a low polydispersity and one or more non-crystalline segments.

In some examples, the composite polyol can comprise 3 or more branched semi-crystalline polymer segments (e.g., 4 or more, 5 or more, 6 or more, 7 or more, 8 or more, or 9 or more). In some examples, the composite polyol can comprise 10 or less branched semi-crystalline polymer segments (e.g., 9 or less, 8 or less, 7 or less, 6 or less, 5 or less, or 4 or less). The number of branches in the composite polyol can range from any of the minimum values described above to any of the maximum values described above, for example from 3 to 10 (e.g., from 3 to 7, from 7 to 10, or from 4 to 9). In a preferred aspect, the composite polyol comprises linear semi-crystalline polymer segments.

The terms "low polydispersity" and "substantially monodisperse" are used interchangeably to refer to a polydispersity index (PDI), defined as the ratio of the weight average molecular weight to the number average molecular weight, of from 1 to 2.0. In some examples, the molecular weight of the composite polyol can be 6,000 grams per mole (g/mol) or less (e.g., 5,750 g/mol or less: 5,500 g/mol or less; 5,250 g/mol or less; 5,000 g/mol or less; 4,750 g/mol or less; 4,500 g/mol or less; 4.250 g/mol or less; 4.000 g/mol or less; 3,750 g/mol or less; 3.500 g/mol or less; 3,250 g/mol or less; 3,000 g/mol or less; 2,750 g/mol or less; 2,500 g/mol or less; or 2,250 g/mol or less). In some examples, the molecular weight of the composite polyol can be 2,000 g/mol or more (e.g., 2,250 g/mol or more; 2.500 g/mol or more; 2.750 g/mol or more; 3,000 g/mol or more; 3,250 g/mol or more; 3.500 g/mol or more; 3.750 g/mol or more: 4,000 g/mol or more: 4,250 g/mol or more; 4.500 g/mol or more; 4.750 g/mol or more: 5,000 g/mol or more; 5,250 g/mol or more; 5,500 g/mol or more; or 5,750 g/mol or more). The molecular weight of the composite polyol can range from any of the minimum values described above to any of the maximum values described above, for example from 2,000 g/mol to 6,000 g/mol (e.g., from 2,000 g/mol to 4,000 g/mol; from 4,000 g/mol to 6,000 g/mol; from 2,000 to 2,500 g/mol; from 2,500 g/mol to 3,000 g/mol; from 3,000 g/mol to 3,500 g/mol; from 3,500 g/mol to 4,000 g/mol; from 4,000 g/mol to 4,500 g/mol; from 4,500 g/mol to 5,000 g/mol; from 5,000 g/mol to 5,500 g/mol, from 5,500 g/mol to 6,000 g/mol, or from 3,500 g/mol to 5,500 g/mol).

In some examples, each segment of the branched or linear semi-crystalline polymer is substantially the same molecular weight. In other words, in some examples within each semi-crystalline polymer segment of the composite polyol have a low polydispersity. In some examples, the molecular weight of each semi-crystalline polymer segment can be 2,000 grams per mole (g/mol) or less (e.g., 1,950 g/mol or less; 1,900 g/mol or less; 1,850 g/mol or less; 1,800 g/mol or less; 1,750 g/mol or less; 1,700 g/mol or less; 1,650 g/mol or less; 1,600 g/mol or less; 1,550 g/mol or less; 1,500 g/mol or less; 1,450 g/mol or less; 1,400 g/mol or less; 1,350 g/mol or less; 1,300 g/mol or less; 1,250 g/mol or less; 1,200 g/mol or less; 1,150 g/mol or less; 1,100 g/mol or less; 1,050 g/mol or less; 1,000 g/mol or less; 950 g/mol or less; 900 g/mol or less; 850 g/mol or less; 800 g/mol or less; 750 g/mol or less; or 700 g/mol or less). In some examples, the molecular weight of each semi-crystalline polymer segment can be 650 g/mol or more (e.g., 700 g/mol or more; 750 g/mol or more; 800 g/mol or more; 850 g/mol or more; 900 g/mol or more; 1,000 g/mol or more; 1,050 g/mol or more; 1,100 g/mol or more; 1,150 g/mol or more; 1,200 g/mol or more; 1,250 g/mol or more; 1,300 g/mol or more; 1,350 g/mol or more; 1,400 g/mol or more; 1,450 g/mol or more; 1,500 g/mol or more; 1,650 g/mol or more; 1,700 g/mol or more; 1,750 g/mol or more; 1.800 g/mol or more; 1.850 g/mol or more; 1.900 g/mol or more; or 1.950 g/mol or more). The molecular weight of each semi-crystalline polymer segment can range from any of the minimum values described above to any of the maximum values described above, for example from 650 g/mol to 2,000 g/mol (e.g., from 650 g/mol to 1,300 g/mol; from 1,300 g/mol to 2,000 g/mol; from 650 g/mol to 800 g/mol; from 8.00 g/mol to 1,000 g/mol; from 1,000 g/mol to 1,200 g/mol, from 1,200 g/mol to 1,400 g/mol, from 1,400 g/mol to 1,600 g/mol; from 1,600 g/mol to 1,800 g/mol; from 1,800 g/mol to 2,000 g/mol; or from 1.000 g/mol to 2.000 g/mol).

In some examples, the branched or linear semi-crystalline polymer segments can include one or more polymer segments chosen from polyethylene, polyethylene terephthalate, polytetrafluoroethylene, isotactic polypropylene, polyphenylene sulfide, polyetherketone, polyetheretherketone, polyphthalamide, polyetherketoneketone, thermoplastic polyimide, polybutylene terephthalate, polyoxymethylene, nylon, polyesters, and poly(caprolactone). In some examples, the branched or linear semi-crystalline polymer segment used herein can comprise a polymer that can undergo stress and/or strain induced crystallization. Examples of polymers that can undergo stress and/or strain induced crystallization include, but are not limited to, natural rubber, polyisoprene, poly(chloroprene), polyethylene glycol, poly(tetrahydrofuran), and poly(caprolactone). In some specific examples, the branched or linear semi-crystalline polymer segment can comprise poly(caprolactone).

The branched or linear composite polyol can also comprise one or more non-crystalline segments. As used herein a "non-crystalline" segment is a compound that is unable to crystallize in the same crystalline unit cell as the branched or linear semi-crystalline polymer segment.

In some examples, the molecular weight of the non-crystalline segment can be 50 g/mol or more (e.g., 60 g/mol or more; 70 g/mol or more; 80 g/mol or more; 90 g/mol or more; 100 g/mol or more; 150 g/mol or more; 200 g/mol or more; 250 g/mol or more; 300 g/mol or more; 350 g/mol or more; 400 g/mol or more; 450 g/mol or more; 500 g/mol or more; 650 g/mol or more; 700 g/mol or more; 750 g/mol or more; 800 g/mol or more; 850 g/mol or more; 900 g/mol or more; 1,000 g/mol or more; 1,050 g/mol or more; 1,100 g/mol or more; or 1,150 g/mol or more). In some examples, the molecular weight of the non-crystalline segment can be 1,200 g/mol or less (e.g., 1,150 g/mol or less; 1,100 g/mol or less; 1,050 g/mol or less; 1.000 g/mol or less; 950 g/mol or less; 900 g/mol or less; 850 g/mol or less; 800 g/mol or less; 750 g/mol or less; 700 g/lmol or less; 650 g/mol or less; 600 g/mol or less; 550 g/mol or less; 500 g/mol or less; 450 g/mol or less; 400 g/mol or less; 350 g/mol or less; 300 g/mol or less; 250 g/mol or less; 200 g/mol or less; 150 g/mol or less; 100 g/mol or less; 90 g/mol or less; 80 g/mol or less; 70 g/mol or less; or 60 g/mol or less).

The molecular weight of the non-crystalline segment can range from any of the minimum values described above to any of the maximum values described above. For example, the molecular weight of the non-crystalline segment can be from 50 g/mol to 1,200 g/mol (e.g., from 50 g/mol to 600 g/mol; from 600 g/mol to 1.200 g/mol; from 50 g/mol to 200 g/mol; from 200 g/mol to 400 g/mol; from 400 g/mol to 600 g/mol; from 600 g/mol to 800 g/mol; from 800 g/mol to 1,000 g/mol; or from 1,000 g/mol to 1,200 g/mol).

In some examples, the molecular weight of the non-crystalline segment can be 20% or less of the molecular weight of the branched or linear semi-crystalline polymer segment (e.g., 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4% or less, 3% or less, 2% or less, or 1% or less). In some examples, the molecular weight of the non-crystalline segment can be from 50 g/mol to 20% of the molecular weight of the branched linear semi-crystalline polymer segment.

In some examples, the non-crystalline segment(s) can be $C_2$-$C_{10}$ alkyl, e.g., an ethyl, propyl, butyl, pentyl, hexyl, heptyl, octyl, nonyl, or decyl group. The non-crystalline segment(s) can be linked to the semi-crystalline segments by an ester, ether, or amide bond.

The composite polyol can, in some examples, have a molecular weight of 2,000 g/mol or more (e.g., 2.250 g/mol or more; 2.500 g/mol or more; 2.750 g/mol or more; 3.000 g/mol or more; 3,250 g/mol or more; 3,500 g/mol or more; 3,750 g/mol or more; 4,000 g/mol or more; 4,250 g/mol or more; 4,500 g/mol or more; 4,750 g/mol or more; 5,000 g/mol or more; 5,250 g/mol or more; 5,500 g/mol or more; 5,750 g/mol or more; 6,000 g/mol or more; 6,250 g/mol or more; 6,500 g/mol or more; 6,750 g/mol or more; 7,000 g/mol or more; 7,250 g/mol or more; 7,500 g/mol or more; or 7.750 g/mol or more). In some examples, the composite polyol can have a molecular weight of 8,000 g/mol or less (e.g., 7,750 g/mol or less; 7,500 g/mol or less; 7,250 g/mol or less; 7,000 g/mol or less; 6,750 g/mol or less; 6,500 g/mol or less; 6,250 g/mol or less; 6,000 g/mol or less; 5,750 g/mol or less; 5,500 g/mol or less; 5,250 g/mol or less; 5,000 g/mol or less; 4,750 g/mol or less; 4,500 g/mol or less; 4,250 g/mol or less; 4,000 g/mol or less; 3,750 g/mol or less; 3,500 g/mol or less; 3,250 g/mol or less; 3,000 g/mol or less; 2,750 g/mol or less; 2,500 g/mol or less; or 2,250 g/mol or less).

The molecular weight of the composite polyol can range from any of the minimum values described above to any of the maximum values described above. For example, the molecular weight of the composite polyol can be from 2,000 g/mol to 8,000 g/mol (e.g., from 2,000 g/mol to 5,000 g/mol: from 5,000 g/mol to 8,000 g/mol: from 2,000 g/mol to 3,000 g/mol; from 3,000 g/mol to 4,000 g/mol; from 4,000 g/mol to 5,000 g/mol; from 5,000 g/mol to 6,000 g/mol; from 6,000 g/mol to 7,000 g/mol; from 7,000 g/mol to 8,000 g/mol; or from 3,000 g/mol to 7,000 g/mol).

In some examples, the composite polyol can have a polydispersity index (PDI), of 1 or more (e.g., 1.1 or more, 1.2 or more, 1.3 or more, 1.4 or more, 1.5 or more, 1.6 or more, 1.7 or more, 1.8 or more, 1.9 or more, or 2.0 or more). In some examples, the composite prepolymer can have a PDI of 2.0 or less (e.g., 2.0 or less, 1.9 or less, 1.8 or less, 1.7 or less, 1.6 or less, 1.5 or less, 1.4 or less, 1.3 or less, 1.2 or less, 1.1 or less, or 1.05 or less). The PDI of the composite polyol can range from any of the minimum values described above to any of the maximum values described above. For example, the composite polyol can have a PDI from 1 to 2.0 (e.g., from 1.05 to 2.0, from 1.2 to 1.9, from 1 to 1.9, from 1.1 to 1.8 from 1.2 to 1.7, from 1.3 to 1.6, from 1.4 to 1.5, from 1.5 to 2.0, from 1.7 to 2.0, from 1 to 1.3, or from 1.1 to 1.4).

The composite polyols suitable for use here can be obtained commercially or can be prepared by synthetic methods. For example, a precursor of the branched or linear semi-crystalline segment polymer as disclosed herein can be reacted with the non-crystalline segment. As a specific example, a caprolactone can be reacted with an alkyl diol (e.g., butandiol) in the presence of a tin catalyst to produce the composite polyol.

The composite polyol has reactive hydroxyl groups that are available for bond formation; that is, the composite polyol can be reacted with the multifunctional crosslinker to form a bond with the multifunctional crosslinker. The reactive hydroxyl groups can be on the ends of the composite polyol (i.e., terminal groups). Also contemplated are composite polyols with other reactive groups, e.g., thiol groups.

The multifunctional isocyanate has reactive isocyanate groups that are available for bond formation; that is the multifunctional isocyanate can crosslink with the reactive hydroxyl groups of the composite polyol.

In some examples, the multifunctional isocyanate can comprise 2 or more isocyanate groups (e.g., 3 or more, 4 or more, or 5 or more). In some examples, the multifunctional isocyanate can comprise 6 or less isocyanate groups (e.g., 5 or less, 4 or less, or 3 or less). The number of isocyanate groups of the multifunctional isocyanate can range from any of the minimum values described above to any of the maximum values described above, for example from 2 to 6 (e.g., from 2 to 4, from 4 to 6, from 3 to 5, from 2 to 3, from 3 to 4, from 4 to 5, or from 5 to 6). In some examples, the multifunctional isocyanate can comprise a tri-isocyanate. In specific examples, the multifunctional isocyanate is a DESMODUR™ from Covestro, e.g., diphenylmethane diisocyanate, toluylene diisocyanate, and IPDI. In specific examples, the multifunctional isocyanate is DESMODUR™ N3300, i.e., 1,3,5-tris(6-isocyanatohexyl)-1,3,5-triazinane-2,4,6-trione.

In some examples, the effective molecular weight between crosslinks of the shape-memory polymer can be 1,000 g/mol or more (e.g., 1,500 g/mol or more; 2,000 g/mol or more; 2,500 g/mol or more; 3,000 g/mol or more; 3,500 g/mol or more; 4,000 g/mol or more; 4,500 g/mol or more; 5,000 g/mol or more; 5,500 g/mol or more; 6,000 g/mol or more; 6,500 g/mol or more; 7,000 g/mol or more; 7,500 g/mol or more; 8,000 g/mol or more; 8,500 g/mol or more; 9,000 g/mol or more; or 9,500 g/mol or more). In some examples, the effective molecular weight between crosslinks of the shape-memory polymer can be 10,000 g/mol or less (e.g., 9,500 g/mol or less; 9,000 g/mol or less; 8,500 g/mol or less; 8,000 g/mol or less; 7,500 g/mol or less; 7,000 g/mol or less; 6,500 g/mol or less; 6,000 g/mol or less; 5,500 g/mol or less; 5,000 g/mol or less; 4,500 g/mol or less; 4,000 g/mol or less; 3,500 g/mol or less; 3,000 g/mol or less: 2,500 g/mol or less; 2,000 g/mol or less; or 1,500 g/mol or less).

The effective molecular weight between crosslinks of the shape-memory polymer can range from any of the minimum values described above to any of the maximum values described above. For example, the effective weight between crosslinks of the shape-memory polymer can be from 1,000 g/mol to 10,000 g/mol (e.g., from 1,000 g/mol to 5,500 g/mol; from 5,500 g/mol to 10,000 g/mol; from 1,000 g/mol to 2,500 g/mol; from 2,500 g/mol to 4,000 g/mol; from 4,000 g/mol to 5,500 g/mol; from 5,500 g/mol to 7,000 g/mol; from 7,000 g/mol to 8,500 g/mol; from 8,500 g/mol to 10,000 g/mol; or from 2.000 g/mol to 9,000 g/mol).

In some examples, the shape-memory polymers described herein can store elastic energy. In some examples, the shape-memory polymer can have an elastic energy density of 1 megajoules per cubic meter ($MJ/m^3$) or more (e.g., 1.1 $MJ/m^3$ or more, 1.2 $MJ/m^3$ or more, 1.3 $MJ/m^3$ or more, 1.4 $MJ/m^3$ or more, 1.5 $MJ/m^3$ or more, 1.6 $MJ/m^3$ or more, 1.7 $MJ/m^3$ or more, 1.8 $MJ/m^3$ or more, 1.9 $MJ/m^3$ or more, 2.0 $MJ/m^3$ or more, 2.1 $MJ/m^3$ or more, 2.2 $MJ/m^3$ or more, 2.3 $MJ/m^3$ or more, 2.4 $MJ/m^3$ or more, 2.5 $MJ/m^3$ or more, 2.6 $MJ/m^3$ or more, 2.7 $MJ/m^3$ or more, 2.8 $MJ/m^3$ or more, or 2.9 $MJ/m^3$ or more). In some examples, the shape-memory polymers can have an elastic energy density of 3 $MJ/m^3$ or less (e.g., 2.9 $MJ/m^3$ or less, 2.8 $MJ/m^3$ or less, 2.7 $MJ/m^3$ or less, 2.6 $MJ/m^3$ or less, 2.5 $MJ/m^3$ or less, 2.4 $MJ/m^3$ or less, 2.3 $MJ/m^3$ or less, 2.2 $MJ/m^3$ or less, 2.1 $MJ/m^3$ or less, 2.0 $MJ/m^3$ or less, 1.9 $MJ/m^3$ or less, 1.8 $MJ/m^3$ or less, 1.7 $MJ/m^3$ or less, 1.6 $MJ/m^3$ or less, 1.5 $MJ/m^3$ or less, 1.4 $MJ/m^3$ or less, 1.3 $MJ/m^3$ or less, 1.2 $MJ/m^3$ or less, or 1.1 $MJ/m^3$ or less). The elastic energy density of the shape-memory polymer can range from any of the minim values described above to any of the maximum values described above, for example from 1 $MJ/m^3$ to 3 $MJ/m^3$ (e.g., from 1 $MJ/m^3$ to 2 $MJ/m^3$, from 2 $MJ/m^3$ 3 $MJ/m^3$, from 1 $MJ/m^3$ to 1.5 $MJ/m^3$, from 1.5 $MJ/m^3$ to 2 $MJ/m^3$, from 2.5 $MJ/m^3$ to 3 $MJ/m^3$, or from 1.5 $MJ/m^3$ to 1.5 $MJ/m^3$).

The stored elastic energy can be determined by (i) stretching a rectangular specimen to a specified relative strain (400% is used herein); (ii) releasing the applied load and measuring the resulting fixed strain; (iii) heating the sample while held at a constant strain to generate a tensile stress; and (iv) recording sample strain while slowly reducing stress, or recording stress while slowly decreasing the strain. The data from step (iv) of the above (in stress-strain space) can be integrated and divided by sample volume to determine the energy storage per volume of sample.

In some examples, the shape-memory polymer can have an energy storage efficiency (which is the energy in during the room temperature strain process compared to energy out when the sample is heated above its transition temperature and slowly recovered during shape recovery) of 50% or more (e.g., 50% or more, 55% or more, 60% or more, 65% or more, 70% or more, 75% or more, 80% or more, 85% or more, 90% or more, 95% or more, or 99% or more). In some examples, the shape-memory polymer can have an energy storage efficiency of 100% or less (e.g., 99% or less, 95% or less, 90% or less, 85% or less, 80% or less, 75% or less, 70% or less, 65% or less, 60% or less, or 55% or less). The energy storage efficiency of the shape-memory polymer can range from any of the minimum values described above to any of the maximum values described above, for example from 50% to 100% (e.g., from 55% to 90%, from 60 to 100%, from 70 to 100%, from 80 to 100%, from 90% to 100%, from 70% to 85%, from 85% to 95%, from 90% to 95%, from 95% to 100%, or from 65% to 95%).

In some examples, the shape-memory polymer can have a strength of 1 megapascals (MPa) or more (e.g., 1.5 MPa or more, 2 MPa or more, 2.5 MPa or more, 3 MPa or more, 3.5 MPa or more, 4 MPa or more, 4.5 MPa or more, 5 MPa or more, 5.5 MPa or more, 6 MPa or more, 6.5 MPa or more, 7 MPa or more, 7.5 MPa or more, 8 MPa or more, 8.5 MPa or more, 9 MPa or more, or 9.5 MPa or more). In some examples, the shape-memory polymer can have a strength of 10 MPa or less (e.g., 9.5 MPa or less, 9 MPa or less, 8.5 MPa or less, 8 MPa or less, 7.5 MPa or less, 7 MPa or less, 6.5 MPa or less, 6 MPa or less, 5.5 MPa or less, 5 MPa or less, 4.5 MPa or less, 4 MPa or less, 3.5 MPa or less, 3 MPa or less, 2.5 MPa or less, 2 MPa or less, or 1.5 MPa or less). The strength of the shape-memory polymer can range from any of the minimum values described above to any of the maximum values described above, for example from 1 MPa to 10 MPa (e.g., from 1 MPa to 5 MPa, from 5 MPa to 10 MPa, from 1 MPa to 2.5 MPa, from 2.5 MPa to 5 MPa, from 5 MPa to 7.5 MPa, from 7.5 MPa to 10 MPa, from 2 MPa to 9 MPa, or from 2 MPa to 3 MPa).

In some examples, the shape-memory polymer can have a strain fixity of 65% or more (e.g., 70% or more, 75% or more, 80% or more, 85% or more, 90% or more, or 95% or more). In some examples, the shape-memory polymer can have a strain fixity of 100% or less (e.g., 95% or less, 90% or less, 85% or less, 80% or less, 75% or less, or 70% or less). The strain fixity of the shape-memory polymer can range from any of the minimum values described above to any of the maximum values described above, for example from 65% to 100% (e.g., from 65% to 80%, from 80% to 100%, from 65% to 75%, from 75% to 85%, or from 85% to 100%).

In some examples, the shape-memory polymer can have a stress free or unconstrained shape recovery ratio of 0.9 or more (e.g., 0.91 or more, 0.92 or more, 0.93 or more, 0.94 or more, 0.95 or more, 0.96 or more, 0.97 or more, 0.98 or more, or 0.99 or more). In some examples, the shape-memory polymer can have a stress free or unconstrained shape recovery ratio of 1.0 or less (e.g., 0.99 or less, 0.98 or less, 0.97 or less, 0.96 or less, 0.95 or less, 0.94 or less, 0.93 or less, 0.92 or less, or 0.91 or less). The stress free or unconstrained shape recovery ratio of the shape-memory polymer can range from any of the minimum values described above to any of the maximum values described above, for example from 0.9 to 1.0 (e.g., from 0.9 to 0.95, from 0.95 to 1.0, from 0.9 to 0.93, from 0.93 to 0.96, or from 0.96 to 1.0).

EXAMPLES

The following examples are set forth below to illustrate the methods and results according to the disclosed subject matter. These examples are not intended to be inclusive of all aspects of the subject matter disclosed herein, but rather to illustrate representative methods, compositions, and results. These examples are not intended to exclude equivalents and variations of the present invention, which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, temperatures, pressures, and other reaction ranges and conditions that can be used to optimize the product purity and yield obtained from the described process. Only reasonable and routine experimentation will be required to optimize such process conditions.

DESMODUR™ N3300A, a tri-functional isocyanate, with 5.2×10-3 moles of NCO per g of reagent, was from Covestro. CAPA™ 2054, a poly(caprolactone) (MW=500 g mol$^{-1}$), was from by Perstorp. Di-n-butyltin dilaurate (DBTDL) was purchased from Sigma-Aldrich. All chemicals were used as-received.

Reaction Injection Molding Apparatus

Figure 2A:
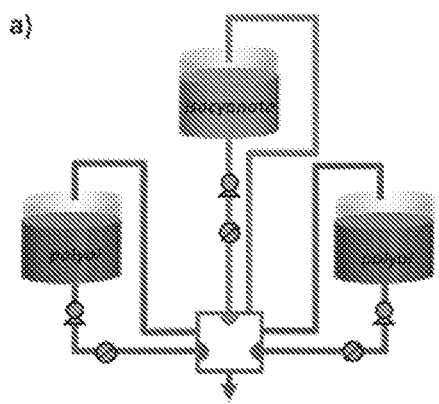
FIGS. 2A and 2B are schemes showing reagent flow in the RIM process.
Figure 2B:
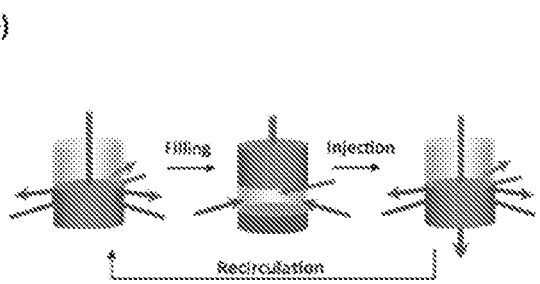

FIGS. 2A and 2B illustrate material flow through the RIM apparatus during recirculation and injection stages. Polyol (CAPA™ 2054) and isocyanate (DESMODUR™ N3300A) are preloaded into three one-gallon stainless steel cylindrical supply tanks. The air-tight tanks are pressurized with nitrogen at 15 psi. At room temperature, all reagents are liquids with relatively low viscosity (<4,000 mPa·s) and low vapor pressure. The reagents are not thermally controlled or stirred in their supply tanks. An industrial motor pump (Dayton 11 W374 Tri-Volt) draws reagent material from the bottom of the supply tanks into a ⅜" hydraulic supply line. The operator specifies the pump's power output, and it is typically set at 20% of its max power (1900 W). The volumetric flowrate of each reagent through its respective supply line is monitored by a flowmeter (AW GearMeters DH-B).

Figure 3A:
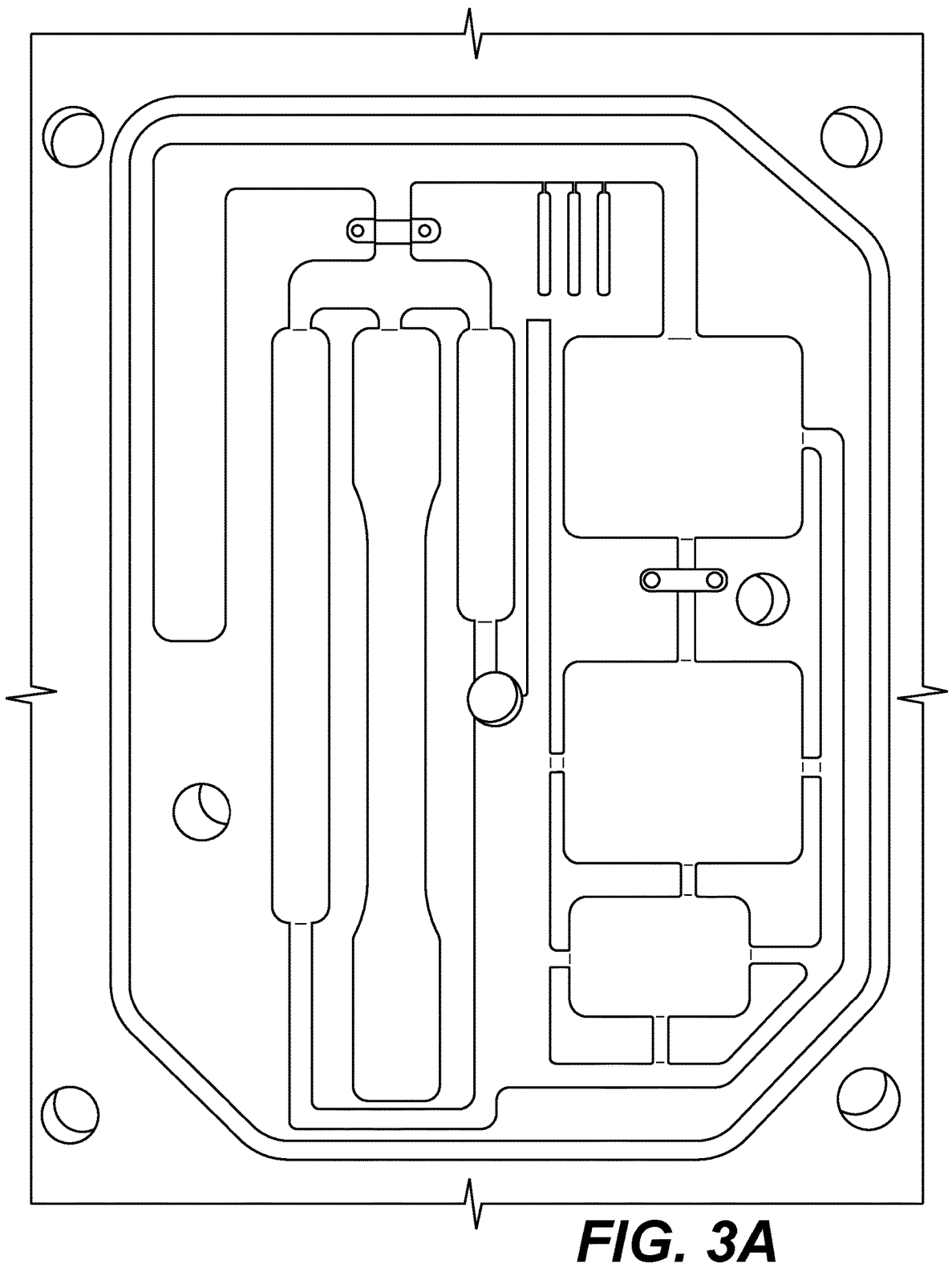
FIG. 3A is a photograph of an aluminum RIM mold.
Figure 3B:
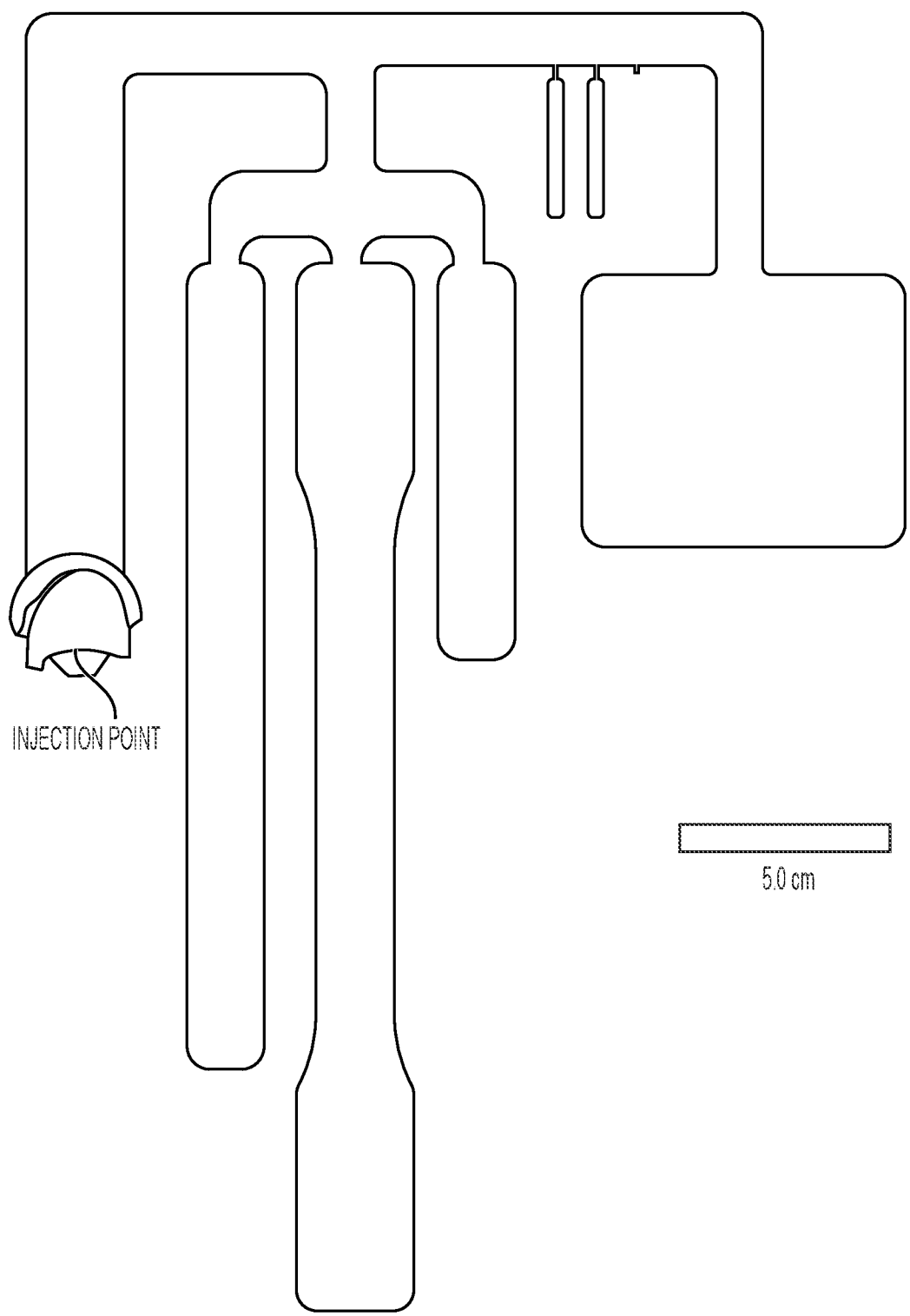
FIG. 3B is a photograph of a PCL urethane network specimen from RIM process.

A manually adjustable needle valve is present near the mix-head to control the system pressure, typically around 1200 psi. Before entering the mix-head, the mixture passes through an orifice with a diameter of 1.0 mm. Each stream's pressure and temperature are measured just upstream of the orifice. Prior to injection, each material stream is continuously recirculated—a piston blocks the flow into the mixing chamber. A hydraulic pump (Haldex Hydraulics Oil Pump W Dayton G67420) retracts the piston for a designated time (~1 s), allowing material to flow into the mixing chamber and be mixed together. Reagents enter the mixing chamber at high velocity and impinge upon one another before flowing into a heated mold. The mixture remains in the heated mold for a specified time and can be removed after sufficient curing. This process produces specimens that are suitable for mechanical testing. The mold and a molded polyurethane part are shown in FIGS. 3A and 3B.

The RIM system is controlled with a touch-screen user interface (Automation Direct). The main interface displays real-time pressure, temperature, and flowrate of each supply line as well as the pressure of the hydraulic pump. In addition, the user can control pump power, shot formulation, and shot duration. Finally, the system has adjustable auto shutdown limits for maximum and minimum operational pressure and temperature specs to ensure safe operation.

Injection Protocol

A quantity of 1400 mL of polyol (CAPA™ 2054) was charged into two tanks (tanks A and C) of the RIM system, and 1800 mL of DESMODUR™ N3300A was charged into the third (tank B). Di-n-butyltin dilaurate (40 mL), a catalyst for urethane chemistry, was charged into tank A and manually stirred. The total weight of the injected material was designed to be 39.0 g, and recirculating lines A, B, and C were programmed to release 12.0:15.0:12.0 parts (by volume) of the containing reagents, respectively. This formulation was chosen to guarantee a balanced (—OH:—NCO) stoichiometry. In such a typical shot, the amount of catalyst makes up 0.85 wt % of the total formulation.

During an injection procedure, the head space in each reagent tank is first pressurized by nitrogen gas to ~15 psi. The pumps are switched on, and reagents are recirculated in their respective loops at a predefined, low-level volumetric flowrate. The shot formulation and shot size are entered into the user interface panel, and high pressure recirculation mode is activated to simulate the injection environment at relatively high recirculation speed. At this point, the mixing pressure at each orifice, just upstream of the mix-head are adjusted using respective needle valves to ensure comparable injection pressures (typically 1,600 psi) for each component. Once the pour cycle is triggered, a piston inside the mix-head retracts, breaking all three recirculation loops, and the compositions mix and impinge at a high pressure (see FIGS. 2A and 2B). When the injection is complete, the resulting reaction mixture is further pressed into the mold by the piston as it returns to its original position. When the mixed streams enter the mold, their pressure drops to circa 100 psi. The mold is detached from the RIM instrument shortly after the shot. At this point, the molded material has formed a network well above its percolation threshold, and the part can be easily released from the mold. Molded specimens are typically post-cured at 60° C., for 24 hours.

Characterization

Vibrational Spectroscopy.

Attenuated total-reflection Fourier transform infrared (ATR-FTIR) spectroscopy (Shimadzu 8000S) was used to assess the presence of isocyanate and hydroxyl end-groups near the surface of the cured RIM sample. Fourier transform infrared spectroscopy (FT-IR, Bruker Tensor 27) was also performed on the two liquid precursors, CAPA™ 2054 and DESMODUR™ N3300A.

Gel Fraction.

Gel fraction tests were performed on all cured RIM samples to determine the mass percentage of extractable species. Before each measurement, films were dried at 60° C., overnight and weighed. Films were then swollen in acetone for 96 hours to extract any free molecular species that are not covalently connected to the network (i.e., catalyst, free prepolymers, unreacted DESMODUR™). Finally, the resulting films were vacuum-dried for another four hours, and their masses again recorded. Gel fraction was determined as the ratio of the second to the first recorded weight.

Scanning Electron Microscopy.

A Zeiss AURIGA-CrossBeam was used to observe the cross-sectional morphology of the sample film. Samples were immersed in liquid nitrogen, before being cold-fractured, and they were coated with gold vapor for 20 seconds prior to SEM analysis.

Mechanical Tests.

Dynamic Mechanical Analysis (DMA) experiments were performed on a Rheometrics RSAII solids analyzer. Rectangular samples with dimensions of 2.65×1.40×20 mm were directly taken from the RIM specimen. Storage and loss moduli were measured in tension as a function of temperature. A temperature sweep test was performed using a fixed oscillatory strain of 0.5% at 1 Hz at 10° C./min over the range of 25° C., to 180° C., followed by a hold at 180° C., for half an hour. To test the material strain-to-break, the DMA instrument was programmed to strain a specimen at a constant rate of 3.0 mm/min until failure was observed.

Thermosets Molded With Balanced Stoichiometry

RIM of stoichiometrically balanced formulations with equal molar amounts of —OH and —NCO reactive groups following the chemistry in FIGS. 1A-1D were performed. Functional groups react to produce a urethane linkage, and, as the reaction proceeds beyond the gel point, a macroscopically connected network structure is formed.

Figure 4:
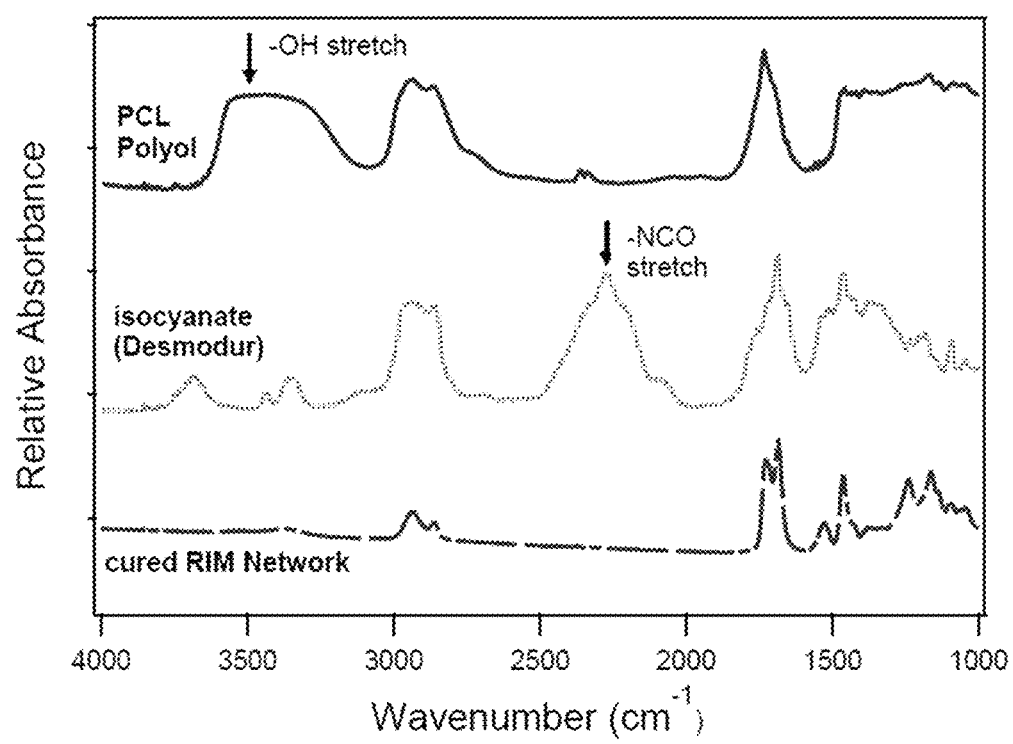
FIG. 4 shows FTIR plots of PCL polyol (PCL CAPA™ 2054), isocyanate (DESMODUR™ N3300A), and cured RIM PCL urethane network with balanced stoichiometry.

Elastomers prepared using RIM with a stoichiometrically balanced formulation were studied using ATR-FTIR. FIG. 4 compares three absorption spectra of three materials: the PCL-polyol polymer, the DESMODUR™ reagent, and the molded product polyurethane. The absorption peak at ~2270 $cm^{-1}$ is attributed to the strong asymmetric stretching of DESMODUR™'s isocyanate groups, and the broad peak at 3200~3600 $cm^{-1}$ indicates hydroxyl stretching from the polyol. The disappearance of these absorption bands upon reaction injection molding confirms that the majority of isocyanate and hydroxyl groups have been consumed.

Samples molded with a fixed, stoichiometrically balanced formulation exhibit consistent and very reproducible mechanical properties. FIG. 5 shows strain-to-break data for a series of stoichiometrically balanced RIM samples made in five consecutive runs with identical mixing/injection conditions. The average breakage strain was 97.7% with a standard deviation $\sigma$<3.5%. The Young's modulus E calculated from the same stress-strain data also fell into a narrow range (E=2.90 MPa; $\sigma$<5%). Thus, the RIM method appears to be a robust and reproducible process. All of the RIM-molded samples appear opaque and white in color (see FIGS. 3A and 3B). However, small samples (~1 g) molded between glass slides after manual mixing with a spatula appear transparent. SEM characterization of freeze-fractured cross-sections of RIM samples show microscopic bubbles. The bubbles likely form as the prepolymer is pumped into the recirculation loop from the supply tanks under ~15 psi of nitrogen. The bubbles remain in the mixture and leave empty pores after the mixed reagents are cured. The bubble size ranged from tens of microns to one-hundred microns; larger bubbles appear to be interconnected. Based on density measurement, the bubbles take up roughly 10% of the overall volume of the RIM specimen. These bubbles can effectively scatter all incident visible light, causing the specimen to display white color.

Effect of Mixing Pressure

Fast and efficient mixing is the centerpiece of the RIM technique. Mixing between the polyol and isocyanate streams is achieved in the mix-head. There, the high pressure in the recirculation streams is converted into kinetic energy by allowing the material to pass through an orifice. The high-speed jet streams impinge upon one another to mix in a small volume before flowing into the mold. To assess mixing efficacy, a small amount of a methylene blue dye was dissolved into one of the two polyol lines. The spatial fluctuations in dye concentration are clearly visible and indicate poor mixing.

Four specimens with stoichiometrically balanced feeds were molded at 35° C., using different injection pressures of 400, 800, 1200, and 1600 psi. Planar and cross-section digital images of the dye variation near the injection point are shown in FIGS. 7A and 7B. The dye uniformity and the homogeneity of the specimens show a clear dependence on injection pressure. At low pressure, striations are present, indicating laminar flow. Specimens molded at the lowest pressures (400 and 800 psi) were so poorly mixed that curing was incomplete; liquid material was observed in regions of these specimens. With increasing pressure, spatial variation in dye concentration diminish, and the elastomer morphology appears gradually more uniform. Operating RIM at high enough pressure to ensure good material mixing helps achieve high quality properties. However, conducting RIM at pressures too high can result in unwanted pressure fluctuations and process instabilities.

The dimensionless Reynolds number provides a basis for understanding how mixing effectiveness relates to pressure. The Reynolds number of material entering the RIM mixing chamber is where d is the orifice diameter, $v_{inj}$ the fluid velocity at the injector, p the fluid density, and μ the fluid viscosity. It was previously shown that Re=120 marks the transition in flow from a stable segregated flow to a self-sustainable chaotic flow with strong dynamics (M. I. Nunes, et al., *Chem Eng Sci*, 276 (2012); E. Erkoc, et al., *Chem Eng Sci*, 18-20, 5276 (2007)), with the latter being favorable for effective mixing in a RIM process. A calculation based on our lab-scale RIM system shows that, in order to achieve Re=120, a minimum pressure of 1450 psi is required. This pressure agrees well with our observations that specimens produced at lower pressure (400, 800, 1200 psi) showed ineffective mixing but that produced at higher pressure (1600 psi) indicate good mixing.

Thermosets Molded Off-Stoichiometry

The reaction injection molding apparatus is capable of rapid and systematic assessment of test formulations. One can simply modify the feed ratio and amount of respective reagent streams to achieve a spectrum of cured formulations that display different tensile behaviors. The rapid prototyping ability can avoid the labor-intensive manual molding process and has a straightforward path to industrial scale-up.

To demonstrate the RIM system's capability to tune specimen physical properties, seven elastomer samples were molded with different (—OH:—NCO) molar ratios. Table 1 lists the formulations for all specimens. The molar ratios were set at equal intervals between 80% and 120%, such that, once completely cured, all specimens are above their gel point (74% conversion). Each sample's gel fraction was assessed by acetone swelling and mechanical properties were studied using dynamic mechanical analysis to determine the storage and loss modulus (E', E").

TABLE 1

Formulation of off-stoichiometry PCL urethane networks prepared through reaction injection molding.

| Sample ID | —OH/—NCO ratio | PCL—OH volume, cm³ (Tank A) | —NCO volume, cm³ (Tank B) | PCL—OH volume, cm³ (Tank C) |
|---|---|---|---|---|
| PCL-DM-80 | 80% | 10.0 | 15.4 | 10.0 |
| PCL-DM-86 | 86% | 10.3 | 14.9 | 10.3 |
| PCL-DM-93 | 93% | 10.6 | 14.3 | 10.6 |
| PCL-DM-100 | 100% | 10.9 | 13.7 | 10.9 |
| PCL-DM-107 | 107% | 11.2 | 13.1 | 11.2 |
| PCL-DM-113 | 113% | 11.5 | 12.6 | 11.5 |
| PCL-DM-120 | 120% | 11.7 | 12.3 | 11.7 |

FIG. 8 shows how the networks' gel fraction and storage modulus depend on stoichiometric ratio of reactive groups. Gel fractions all exceeded 75%, and storage moduli exceeded 1 MPa. Both monotonically decrease with increasing hydroxyl content, and, interestingly, a peak in properties at the stoichiometric equivalence point is absent. This was attributed to the reaction of free isocyanate groups with urethane bonds to form allophanates (FIG. 1D), further crosslinking the material.

Figure 9:
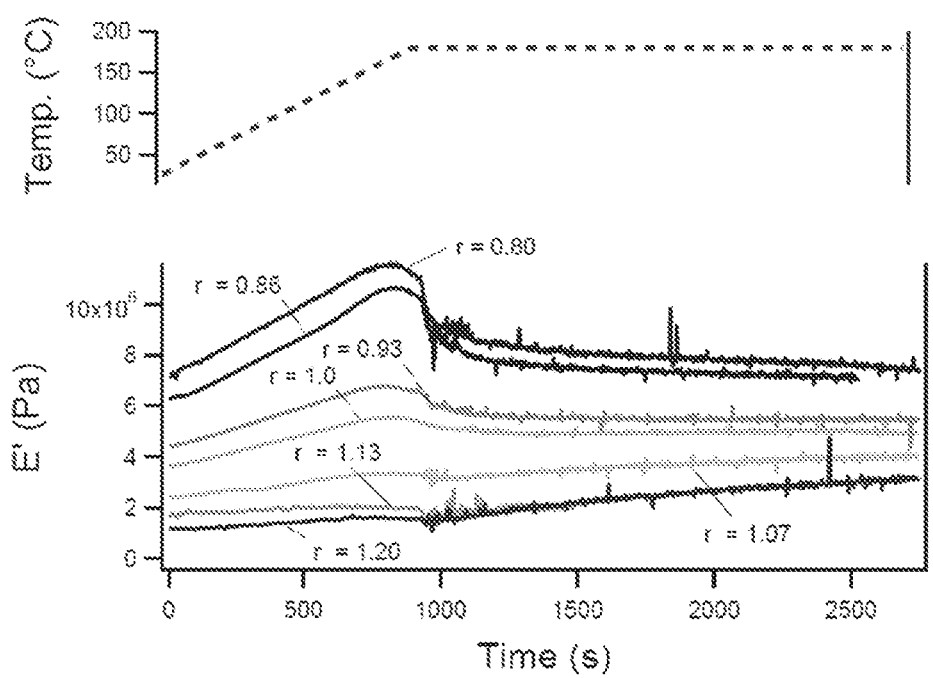
FIG. 9 shows time evolution of storage modulus curves of the seven RIM specimens made with systematically different formulations, in DMA temperature sweep tests. Tags on data traces indicate ratio of —OH to —NCO functional groups in the feed streams.

The presence of allophanates could not be observed using IR methods because of interfering peaks. However, isocyanates are precursors to the allophanates, and ATR-FTIR did show that all isocyanates had reacted-even in samples with stoichiometric excess of isocyanates. Allophanates are known to be thermally unstable at elevated temperatures (Q. W. Lu. T. R. Hoye, and C. W. Macosko. *J Polym Sci Pol Chem.* 14, 2310 (2002); Lapprand, et al., *Polym Degrad Stabil*, 2, 363 (2005)); thus, a temperature ramp experiment was designed to study thermal stability of molded thermosets. Data are displayed in FIG. 9. All specimens were subject to constant strain oscillation (0.5%) while heating from 30° C. to 180° C., at 10° C./min. Specimens were then held at 180° C., for half-an-hour. During the heating phase, the storage modulus of all samples increased due to entropic elasticity. Samples with excess isocyanate exhibited a clear peak in E' around 160° C., followed by a decrease that continued as the temperature was held at 180° C. This decrease in modulus is indicative of allophanate decomposition which results in a partial loss of network connectivity. Specimens with nearly balanced stoichiometry also display a peak in E', but the subsequent drop in modulus is less significant. Specimens with excess hydroxyl groups showed an increase in modulus while holding at 180° C., and this is possibly due to the high temperature formation of carbodiimides and their subsequent reaction with excess alcohol groups to form crosslinked structures (Q. W. Lu, T. R. Hoye, and C. W. Macosko, *J Polym Sci Pol Chem.* 14, 2310 (2002)).

The methods and compositions of the appended claims are not limited in scope by the specific methods and compositions described herein, which are intended as illustrations of a few aspects of the claims and any methods and compositions that are functionally equivalent are within the scope of this disclosure. Various modifications of the methods and compositions in addition to those shown and described herein are intended to fall within the scope of the appended claims. Further, while only certain representative methods, compositions, and aspects of these methods and compositions are specifically described, other methods and compositions and combinations of various features of the methods and compositions are intended to fall within the scope of the appended claims, even if not specifically recited. Thus a combination of steps, elements, components, or constituents can be explicitly mentioned herein; however, all other combinations of steps, elements, components, and constituents are included, even though not explicitly stated.

What is claimed is:

1. A method of making a stimuli-responsive thermoset, comprising:
    combining at a pressure of from about 1100 psi to about 2000 psi a reaction mixture consisting essentially of a multifunctional isocyanate with a linear composite diol comprising a linear semi-crystalline polymer segment having a low polydispersity and one or more non-crystalline segments and an optional catalyst; and
    injecting the reaction mixture into a mold where the multifunctional isocyanate crosslinks the linear composite diol, thereby forming a stimuli-responsive thermoset.

2. The method of claim 1, wherein the multifunctional isocyanate and linear composite diol are recirculated before being combined.

3. The method of claim 1, wherein mold is heated to about 30° C. or more.

4. The method of claim 1, wherein the pressure is from about 1450 psi to about 1600 psi.

5. The method of claim 1, wherein the amounts of multifunctional isocyanate and linear composite diol are such that hydroxyl groups and isocyanate groups are at a molar ratio of 0.8:1 to 1:0.8.

6. The method of claim 1, wherein a portion of the linear composite diol is first combined with the multifunctional isocyanate followed by addition of the remainder of the linear or branched composite diol.

7. The method of claim 1, wherein the linear semi-crystalline polymer segment is a linear polycaprolactone.

8. The method of claim 1, wherein the non-crystalline segment comprises $C_2$-$C_{10}$ alkyl.

9. The method of claim 1, wherein the multifunctional polyisocyanate has from 2 to 6 isocyanate groups.

10. The method of claim 1, wherein the multifunctional polyisocyanate is 1,3,5-tris(6-isocyanatohexyl)-1,3,5-triazinane-2,4,6-trione.

11. The method of claim 1, wherein the reaction mixture further comprises a tin catalyst.

12. The method of claim 1, wherein the multifunctional polyisocyanate is 1,3,5-tris(6-isocyanatohexyl)-1,3,5-triazinane-2,4,6-trione and the linear composite diol has linear polycaprolactone semi-crystalline segments and butyl non-crystalline segments and terminal hydroxyl groups.

13. The method of claim 1, wherein the linear composite diol has a number average molecular weight of 500 g/mol or greater.

14. The method of claim 1, wherein the reaction mixture comprises a prepolymer that is crystalline at room temperature.

* * * * *

UNITED STATES PATENT AND TRADEMARK OFFICE
CERTIFICATE OF CORRECTION

PATENT NO. : 12,023,875 B2
APPLICATION NO. : 16/630962
DATED : July 2, 2024
INVENTOR(S) : Mitchell Anthamatten Page 1 of 1

It is certified that error appears in the above-identified patent and that said Letters Patent is hereby corrected as shown below:

In the Claims

Column 17 Line 4 In Claim 6, after "linear" delete "or branched".

Column 17 Line 10 In Claim 9, delete "polyisocyanate" and insert -- isocyanate --.

Column 17 Line 12 In Claim 10, delete "polyisocyanate" and insert -- isocyanate --.

Column 17 Line 17 In Claim 12, delete "polyisocyanate" and insert -- isocyanate --.

Signed and Sealed this
Seventeenth Day of September, 2024

Katherine Kelly Vidal
*Director of the United States Patent and Trademark Office*